US 6,412,080 B1

(12) United States Patent
Fleming et al.

(10) Patent No.: US 6,412,080 B1
(45) Date of Patent: Jun. 25, 2002

(54) LIGHTWEIGHT PERSISTENT STORAGE SYSTEM FOR FLASH MEMORY DEVICES

(75) Inventors: Michael K. Fleming, Seattle; Jun Liu, Redmond, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/255,364

(22) Filed: Feb. 23, 1999

(51) Int. Cl.[7] ................................................ G06F 11/00
(52) U.S. Cl. ........................................ 714/15; 711/103
(58) Field of Search ............................ 714/15, 16, 20, 714/21, 25, 42, 43, 5, 30, 32, 39, 47; 368/201; 711/102, 103

(56) References Cited

U.S. PATENT DOCUMENTS

| | | | | |
|---|---|---|---|---|
| 5,438,573 A | * | 8/1995 | Mangan et al. | 714/711 |
| 5,471,478 A | * | 11/1995 | Mangan et al. | 714/711 |
| 5,581,723 A | * | 12/1996 | Hasbun et al. | 711/103 |
| 5,794,033 A | * | 8/1998 | Aldebert et al. | 713/100 |
| 5,832,493 A | * | 11/1998 | Marshall et al. | 707/101 |
| 6,118,706 A | * | 9/2000 | Smayling et al. | 365/185.33 |
| 6,237,110 B1 | * | 5/2001 | Lin et al. | 714/7 |

OTHER PUBLICATIONS

"Flash File System Selection Guide" Intel Application Note AP–686, Dec. 0998, Order No. 297665–005.
"Understanding the Flash Translation Layer (FTL) Specification" Intel Technical Paper, Apr. 1997, Order No.: 297816–001.
AMD Specification for Flash Memory Chip Am29LV160B, Publication # 21358, Issue Date: Feb. 1999.

* cited by examiner

Primary Examiner—Nadeem Iqbal
(74) Attorney, Agent, or Firm—Klarquist Sparkman LLP (57) ABSTRACT

A non-volatile flash store memory system for storing persistent data with low overhead. The flash store comprises an active flash memory sector and one or more non-active backup sectors. Each memory sector includes a header to indicate the status of the sector and multiple data records, each with their own headers. The data records are organized by key identifiers in combination with offset values to create a linked-list file structure. New records in the active sector can be sequentially added, while existing records can be marked as deleted if it is desired to remove them. Extra memory space can be recaptured by performing a compacting sequence, in which the active records are copied from the active sector to a backup sector, while skipping those records that are marked as deleted. Upon successful completion of the copying process the backup sector becomes the new active sector, and the former active sector is marked as inactive. The compacting sequence is performed so that there is always a valid copy of each data record at all times, and no data will be lost in the event of a power failure or other similar anomaly.

31 Claims, 4 Drawing Sheets

LIGHTWEIGHT PERSISTENT STORAGE SYSTEM FOR FLASH MEMORY DEVICES

FIELD OF THE INVENTION

The present invention relates to method of operating flash memory for persistent storage of data.

BACKGROUND OF THE INVENTION

The Internet has rapidly become the new standard for world-wide communication and data distribution. Someone looking for information on just about any subject will likely be able to find it somewhere on the web. There are millions of pages on the web, containing a wide spectrum of information including the latest news and sports, stock market information, research information on just about any subject, etc. In addition to providing a wealth of information, the Internet allows users to actively participate in a dynamic, ever-changing environment. For instance, the Internet allows people from around the world to discuss politics, play computer games, participate in chat room conversations, and sell goods. The use of the Internet has been expanding exponentially, and is expected to continue to do so for years to come. The increase in the number of web users naturally leads to the creation of more home pages, which contain information of interest to even more users, resulting in a self-perpetuating cycle of growth.

Simply put, the Internet provides a vast array of resources that just about everyone would like to be able to access. However, in order to access the Internet the user needs to have the appropriate hardware, which generally includes a computer, a monitor, a modem, and a connection (generally over a phone line) to an Internet service provider (ISP). Even with the large reductions in the price of computer hardware, the cost of an Internet-capable computer is out-of-reach for most of the world's populous.

One solution to lowering the cost of Internet access is to access the web using an Internet "set-top" box and a television set. Such a concept is used by "WebTV"®. WebTV® uses a processor-based set-top box that connects to an ISP over a phone line, cable, or satellite connection, and provides video signals to drive conventional television screens. In addition, the set-top box has built-in communication circuitry and provides enough computing power to allow a user to surf the web by simply clicking a few buttons on a keyboard or remote control. Since most people in the United States (and billions elsewhere) already have access to television sets, the cost for connecting to the Internet with such a product is primarily the cost of the set-top box (which is much less than the cost of a computer) and the WebTV® ISP service charge.

Although the WebTV® concept was a cost breakthrough, it still has drawbacks. One of the drawbacks is that a WebTV® user must connect to the Internet via a special WebTV® ISP. While this is no problem in largely populated areas, it becomes an issue in more rural areas, and is a significant problem when considering servicing populations outside of the U.S. Another drawback is that the WebTV® set-top boxes provide only limited provisions for storing most user-specific data, such as user preferences and communication settings. For instance, it is desirable to be able to store a list of favorite website addresses to allow the user to easily return to these sites. Since the WebTV® set-top boxes have only limited provisions for storing user-specific data, this user preference data is stored on WebTV® database servers, which are only accessible through the WebTV ISPs. It would be preferable to store the user-specific data in the set-top box itself so that there is no need to use WebTV® ISPs or the WebTV® databases.

If user-specific data is to be stored in the set-top box then it must be stored in a non-volatile manner—that is, it must be retained (persist) when power is removed from the set-top box. The most common way to store persistent data is with a fixed-disk medium, such as a computer hard disk drive. However, a hard disk drive is relatively expensive, and may not be suitable to meet the cost, size, reliability, and ruggedness requirements of such a product. Thus, there is a need for a rugged, reliable, low cost persistent storage device for storing user preferences and other user-specific data on a set-top box device.

SUMMARY OF THE INVENTION

A preferred embodiment of the invention fulfills this need by providing a persistent non-volatile storage system called a "flash store" that provides a simple, low-overhead mechanism for storing information, such as user preferences. The flash store comprises two or more sectors of non-volatile memory, including an active sector and one or more non-active backup sectors. By "ping-ponging" data between the active sector and the backup sector(s), the flash store is able to delete records from the store while maintaining a non-volatile copy of the data. The system is resistant to corruption, and can survive a power failure at any point during a write operation without risk of losing information. The system requires little RAM or other system resources, making it ideal for use in resource-restricted environments, such as Internet set-top boxes.

The illustrated flash store comprises two or more sectors of non-volatile flash memory, including an active sector and one more backup sectors. Each sector has a header that includes a signature value and three status bits. The combinations of the signature value and the status bits indicate whether the sector has been properly initialized, whether the sector is an active or non-active sector (available or not available to receive data), or whether the sector is invalid (may contain invalid data).

Each active sector comprises a plurality of data records, wherein each data record has a record header associated with it. Each record header includes two status bits, a size field, a key ID field, and a next record offset field. The status bits indicate whether the record is a valid, an active record, a deleted record, an invalid record, or a null record.

The key ID field is used to create a link-listed file structure. Data records that pertain to a given subject matter share a common key ID value. These records are listed by their common key ID values and the next record offset value, such that the next record offset value points to the next record in the linked list.

A key ID with a value of 0 is a special key ID for mapping the other key ID's to string variable names (keys) in an application program or operating system that employs the flash store. For instance, a first key ID 0 record may identify that key ID 1 records are associated with registry data, while key ID 2 records are associated with cookie data, etc.

An application program or operating system can communicate with and control operation of the flash store by using a set of API calls. Each API call contains one or more input parameters and provides a return value. For example, the API calls may be used to delete records, retrieve records, create and delete key ID's, create records, etc.

The foregoing and other features of the invention will be more readily apparent from the following detailed description which proceeds with reference to the accompanying drawings.

DETAILED DESCRIPTION

Exemplary Operating Environment

Figure 1:
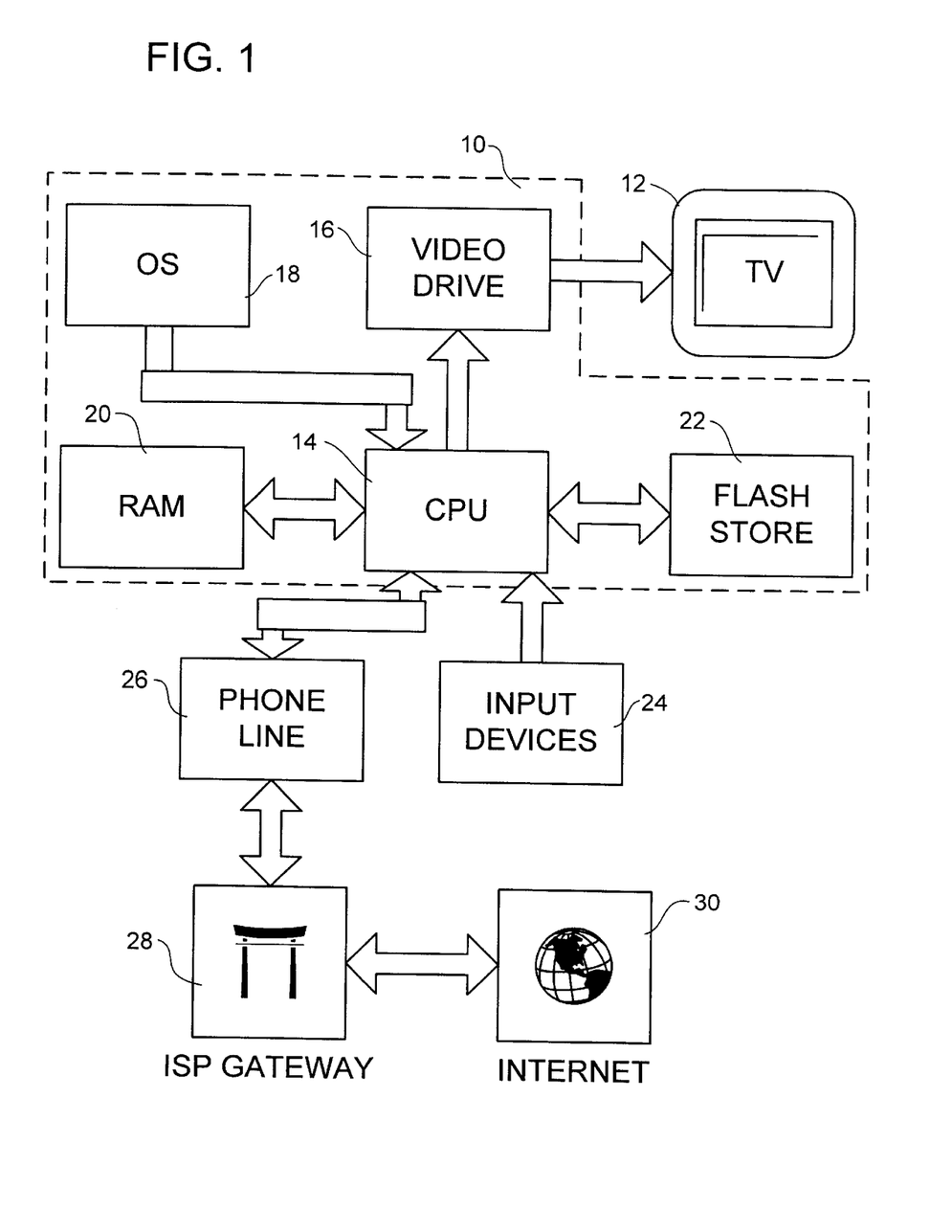
FIG. 1 shows a block diagram of an exemplary operating environment in which the invention may be implemented.

FIG. 1 shows a block diagram of an exemplary operating environment in which the invention may be implemented. The environment includes a set-top box 10 that provides a video output to a television 12. The set-top box 10 comprises a CPU 14, a video drive circuit 16, operating system 18, RAM 20, and flash store 22. The CPU 14 outputs digital control signals to the video drive circuit 16, which produces an analog video signal to drive the television 12. The operating system 18 stores the operating system for the system in non-volatile memory. RAM 20 is used for temporary storage of data, while the flash store 22 is used for non-volatile storage of data. The set-top box 10 receives user input from input devices 24, which typically include a remote keyboard and pointing device. The set-top box 10 is connected via phone line 26 to an Internet service provider 28, which provides a gateway to the Internet 30.

As with the foregoing WebTV® system, the set-top box 10 allows a user to surf the Internet 30 through the use of input devices 24 and the television 12. A noticeable difference, however, is that the set-top box 10 does not require user preferences to be stored on a remote database server, but rather stores this information in the flash store 22.

The flash store 22 comprises a non-volatile storage medium called "flash" memory and associated control hardware and software. Flash memory refers to a class of nonvolatile RAM devices that allows incremental bit-level modifications (like conventional RAM), yet retains their data even in the absence of power (unlike conventional RAM). Flash media allows only two states: erased and non-erased. In the erased state, a byte may be either all ones (0xFF) or all zeros (0x00) depending on the specific flash device. The most common type of flash memory is known as NOR flash. In a NOR flash device the erased state is "1" and the programmed state is "0." In a NOR device an individual bit can be changed from an erased state of "1" to "0", but a bit cannot be modified from a "0" to a "1." Since flash technology does not allow the toggling of individual bits or bytes from a non-erased state back to an erased state, a given byte or bytes of data may only be written when the media is in an erased state. In order to return data bits to an erased state, a significantly larger block of flash memory space called an erase zone (also known as an erase block) must be erased. An erase zone is the smallest contiguous area that can be erased in a single erase operation.

Depending on the particular component, flash memory devices can store from a few kilobytes to 16 or more megabytes of data. The memory mapping of the larger flash devices is typically divided into sectors. For instance, a 1-meg device may be divided into 16 K sectors. The sectors are somewhat analogous to the sectors on a hard disk drive, except that the sectors on a flash memory device are laid out in a linear fashion (sequentially) rather than occupying a short arc segment on a two-dimensional surface. In many devices the sector size and the erase block size are equal, allowing individual sectors of data to be erased without affecting data in the other sectors.

The flash store 22 comprises two or more sectors of flash memory. The two or more sectors of flash memory may reside on an individual flash memory chip specifically used for the flash store, or on a flash memory chip that is used for additional purposes, such as storing an operating system or other non-volatile data.

The flash store implements a record-based storage system that may be simultaneously accessed by several users. The record-based storage system allows records of arbitrary size to be added to the store and allows these records to be deleted in any order. The record-based store has much less overhead than a full flash file system, while still providing all of the flexibility needed to store user preferences.

Exemplary Implementation

Figure 2:
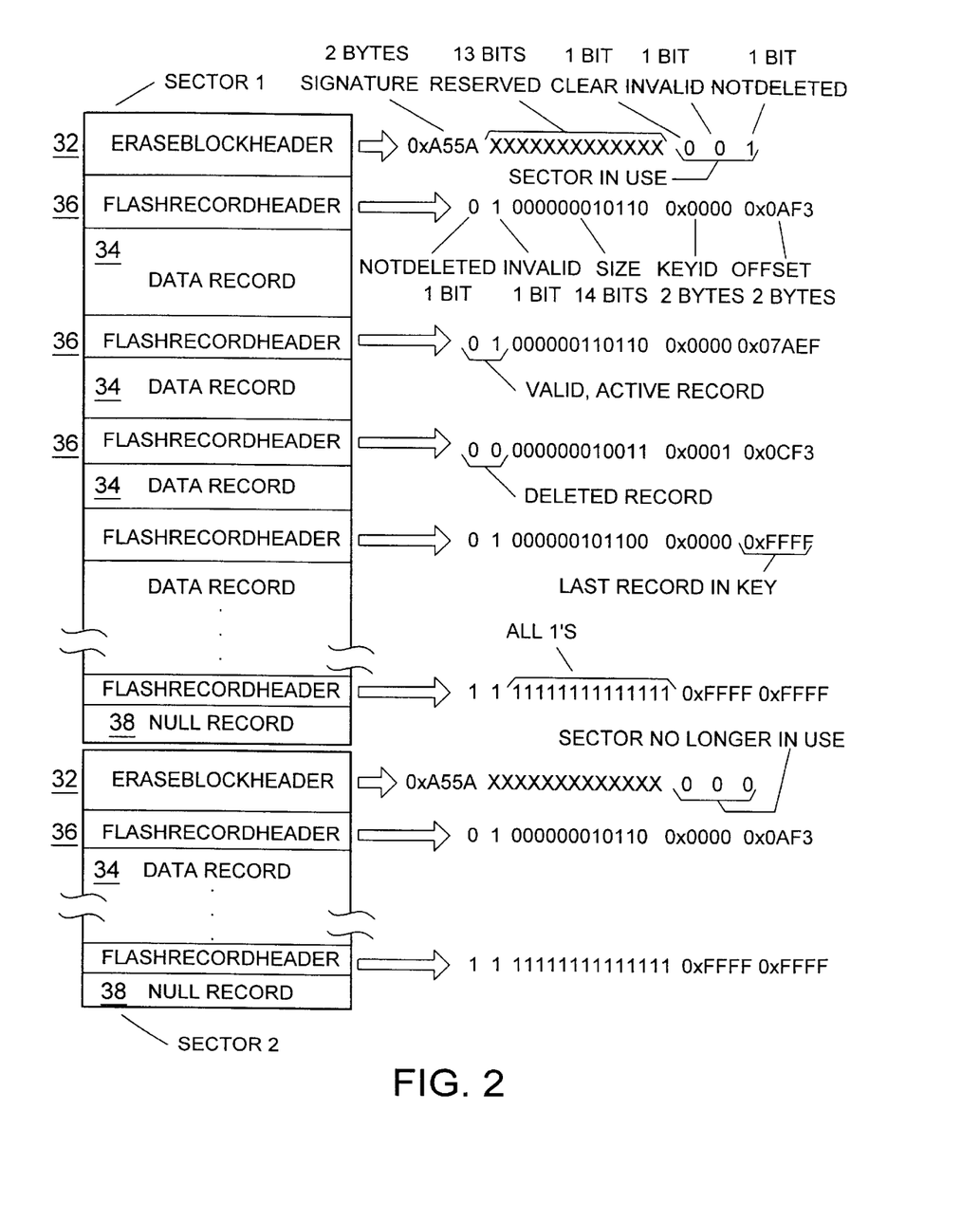
FIG. 2 shows details of the data structure of an implementation of the invention.

An exemplary implementation of the Flash Store is described below, with reference to FIGS. 2, 3A–C, and 4. The flash store comprises a pair of 16 kilobyte sectors of flash memory, labeled sector 1 and sector 2. As shown in FIG. 2, each sector begins with a four-byte EraseBlockHeader 32, which indicates the status of the sector. An array of even-byte-aligned sequentially-written data records 34 immediately follows the EraseBlockHeader 32. Each data record 34 begins with a six-byte FlashRecordHeader 36 comprising status bits, the size of the record, a key to which the record belongs, and an offset to the next record with the same key, the offset alternatively indicating that the record is the last record in a give key. At the end of each sector is a null record 38, which has a FlashRecordHeader comprising all 1's.

With continued reference to FIG. 2, the first two-bytes of the EraseBlockHeader 32 comprise a signature, which is used to indicate that the sector has been properly initialized. The signature is a unique sequence of 16 bits that is chosen so that it is statistically improbable to be accidentally duplicated. For this exemplary implementation the value of the signature must be 0xA55A to be valid; all other values are invalid. If an invalid signature is detected upon startup, the sector is erased and a valid signature is written to the EraseBlockHeader of the sector. The remaining two bytes comprise 13 reserved bits, followed by three status bits: "clear", "invalid" and "notDeleted". All three status bits are initially set to 1 (the erased state). The status bits are set to 0 as the state of the sector changes. The following is a list of possible states for the signature and three status bits of the EraseBlockHeader.

| Signature | clear | Invalid | notDeleted | Meaning |
|---|---|---|---|---|
| Not Valid | X | X | X | Sector not initialized |
| Valid | 1 | 1 | 1 | Sector has been initialized and is empty |
| Valid | 0 | 1 | 1 | Sector is invalid-power failed during a compact operation |
| Valid | 0 | 0 | 1 | Sector is in use |
| Valid | 0 | 0 | 0 | Sector no longer in use; all data has been copied to another sector as a result of a compact. |

The "invalid" bit provides protection against unexpected power failure during a compact operation (explained below). If a sector has the invalid bit set, then the sector must be erased and re-initialized. An example EraseBlockHeader structure is as follows:

```
typedef union __EraseBlockHeader {
    struct {
        // Word 0
        WORD clear :1;          // set if block is clear
        WORD invalid :1;        // clear when copy is complete
        WORD notDeleted :1;     // clear when block no longer used
        WORD reserved1 :13;
        // Word 1
        WORD signature;
    };
    BYTE header[4];
} EraseBlockHeader;
```

The FlashRecordHeader 36 is similar to the EraseBlockHeader 32. The FlashRecordHeader 36 comprises six bytes, including two status bits, a 14-bit size value, a two-byte KeyID, and a two-byte NextRecord offset pointer. Excluding the KeyID and the NextRecord fields, the following is a list of possible states for the FlashRecordHeader.

| Size   | Invalid | notDeleted | Meaning |
|--------|---------|------------|---------|
| All 1's | 1 | 1 | Null record. A null record is always the last record in a sector. |
| Valid  | 1 | 1 | Record is invalid-power failed while the record was partially written. This record is discarded and ignored |
| Valid  | 0 | 1 | Valid, active record |
| Valid  | 0 | 0 | Deleted record. This record is ignored and is not copied on a compact operation. |

An example of the structure of a FlashRecordHeader is presented below.

```
typedef union __FlashRecordHeader {
    struct {
        // Word 0
        WORD notDeleted :1;    // Clear if the record has been
                               // deleted
        WORD invalid :1;       // Clear if the record has
                               // finished writing
        WORD size :14;         // Written first, total size of
                               // record
                               // Record are always word aligned,
                               // so a padding byte
                               // may be inserted!
        // Word 1
        WORD keyID;            // Owner ID
        // Word 2
        WORD nextRecord;       // Offset to the next record with
                               // this owner ID (or 0xffff)
    };
    BYTE header[6];
} FlashRecordHeader;
```

The sequence in which the FlashRecordHeader fields are filled out and bits are cleared is significant. The size of the record is written first. The size field does not include the size of the FlashRecordHeader, and may be an odd-byte quantity (e.g., 0x3 bytes), in which case a single padding byte is inserted between the last byte of data and the next FlashRecordHeader so that the next record will be aligned on an even byte. The KeyID field is written second, and the data associated with the record is written third. Once the data has been written the invalid bit is cleared (set too).

The KeyID provides a low-overhead mechanism for rapidly retrieving record information. Records in the flash store are grouped by their KeyID. For instance, all records pertaining to the addresses of a user's favorite web sites will share a common KeyID. Similarly, all records pertaining to cookies will share a common KeyID, the cookie KeyID being unique from the user's favorites KeyID. The KeyIDs are numbered in sequential order, starting with KeyID 0.

Figures 3A, 3B, 3C:
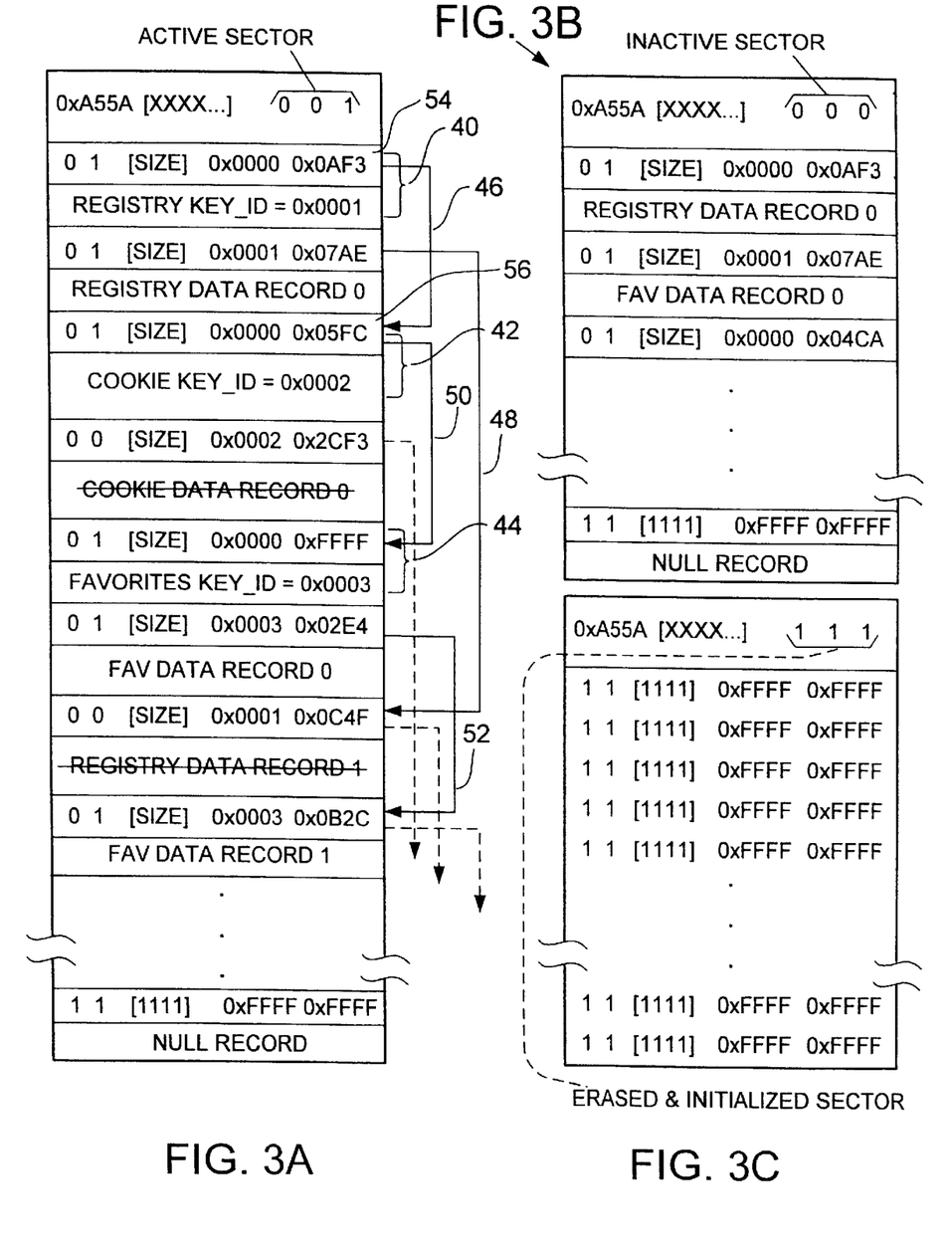
FIG. 3A shows an example of the data structure of an active sector.
FIG. 3B shows an example of the data structure of an inactive sector.
FIG. 3C shows an example of the data structure of an erased and initialized sector.

KeyID 0 is a special KeyID that contains mapping information that ties a particularly set of KeyID entries to an associated text string identifier in the operating system. The KeyID 0 entries define how data is arranged in the store at a top level. For example, a first KeyID 0 entry may define that all KeyID 1 records are associated with records comprising a user's favorite web site addresses, a second KeyID 0 entry may define that all KeyID 2 records are associated with records comprising cookies, etc. There will always be a KeyID 0 record prior to any record corresponding to the mapping information contained in the KeyID 0 record. For example, the store does not allow a KeyID 3 record unless a KeyID 0 mapping for KeyID 3 records exists. Thus, a KeyID 0 record must be added any time any new KeyID is added to the store. Optionally, the first KeyID 0 records may have one or more predetermined entries so that it may be unnecessary to create additional KeyID 0 entries when the first KeyID 1, KeyID 2, etc. records are added. Several KeyID 0 records and their associated FlashRecordHeaders are shown in FIG. 3A, including records 40, 42, and 44.

The KeyIDs and NextRecord offsets are used to create a link-listed file system. With reference to FIG. 3A, commonly-keyed records are linked, as shown by pointers 46, 48, 50, and 52. For example, FlashRecordHeader 54 of record 40 has a KeyID field value of 0x0000, indicating that it is a KeyID 0 record. Similarly, FlashRecordHeader 56 of record 42 also has a KeyID field value of 0x0000. Thus, records 40 and 42 are linked by their KeyIDs. When any new record is added it is the last record in a linked KeyID chain by default. The nextRecord field of all new records is originally set at 0xFFFF (i.e., these bits remain unchanged from their erased state) to indicate the record is the last in the chain. When a record is added to the store with the same KeyID as a previous record, the nextRecord field of the previous record is written to indicate the offset to the new record. For example, FlashRecordHeader 56 contains a NextRecord offset value of 0x0AF3. The NextRecord offset value is equal to the difference between the start of the current record and the start of a subsequent "linked" record with the same KeyID, in this case record 42.

The records that correspond to a given text string identifier in a calling program or operating system can be retrieved as follows. First, the calling program passes the text string to an API call, which iterates through the KeyID 0 records to identify the KeyID that corresponds to the text string. Next, another API call is used to iterate through the records having the KeyID # identified in the first step. For example, at program startup it may be desired to retrieve a list of a user's favorite web site addresses and associated identifier information for each site. The list can be retrieved by invoking a first API call to identify what the KeyID # is that corresponds to the favorite web site records. For instance, in the active sector of FIG. 3A the favorite web site data is stored in records having a KeyID value of 0x0003 or 3 for short. In the second step, a second API call can be used to iterate through the KeyID 3 records until all of the records were retrieved. Alternately, individual records can be located by passing a record number value to the API call. The records can be quickly iterated through by use of the NextRecord offset values, which provide an offset value that points to the address of the next record in the chain, eliminating the need to search through individual headers to identify commonly-keyed records. Furthermore, if the NextRecord offset value is equal to 0xFFFF, then this identifies that the record is the last record in the chain, with such information being passed back to a calling program to indicate that all of the records corresponding to the KeyID # have been searched.

Flash Store Compact Sequence

Since flash devices can only be erased a sector at a time, space occupied by a record cannot be immediately reclaimed when the record is deleted. When a record is deleted, its "notDeleted" bit is set to "0", but the record is left otherwise unmodified until a compact occurs. A compact occurs when the user has requested a record be added to the store that does not fit in the free space of any of the in-use sectors and only one sector is not in use. At this point, the following sequence occurs:

1. If the one remaining unused sector is not already in the initialized but empty state, this sector (the "destination" sector) is erased and initialized, with the resulting sector being similar to the sector shown in FIG. 3C.
2. All non-deleted records are copied from one of the filled sectors (the "source" sector) into the destination sector. Records marked as deleted or invalid are not copied.
3. The invalid bit in the destination sector's EraseBlockHeader is cleared, signifying that the copy operation has been completed.
4. The notDeleted bit in the source sector's EraseBlockHeader is cleared, indicating that the source sector will no longer be used
5. The space that was occupied by the deleted records in the source sector has been recaptured and is available for new records in the destination sector.

The compacting sequence described above prevents data from being lost if execution is interrupted at any point during the compact operation.

Figure 4:
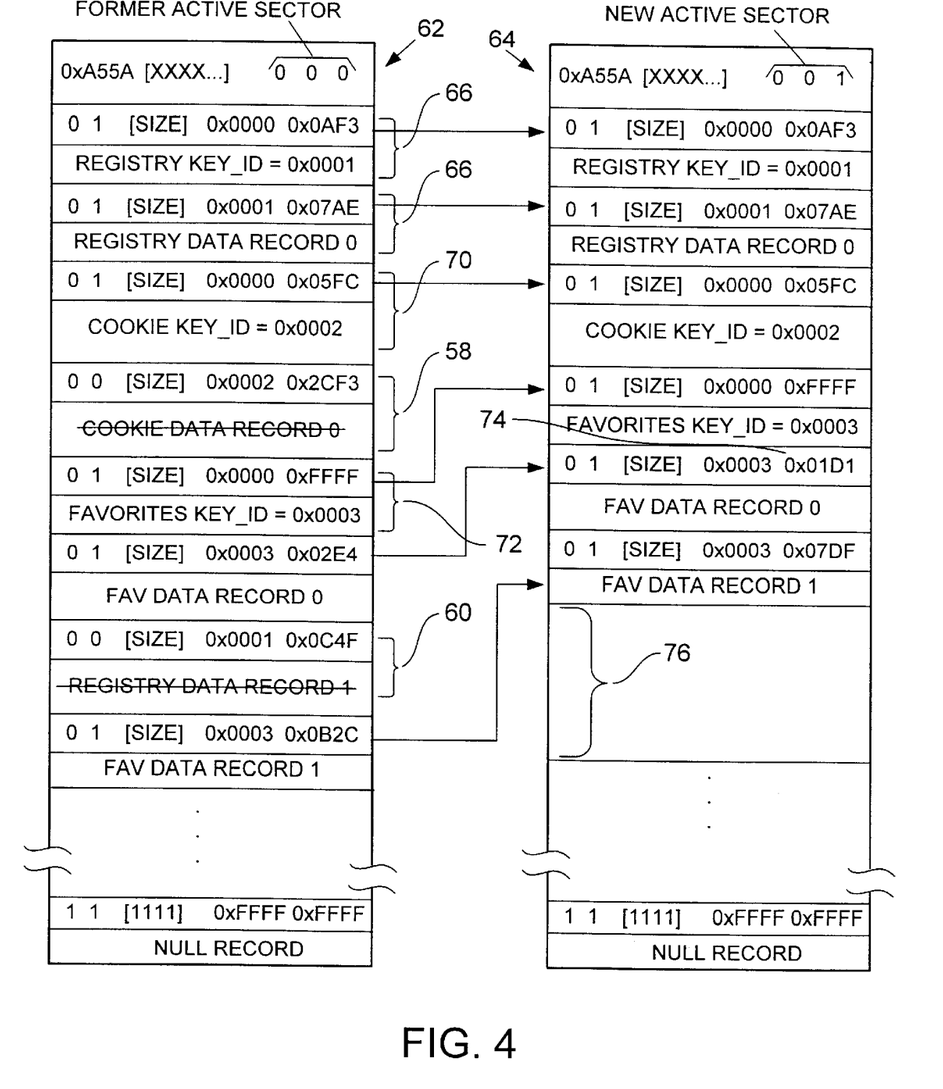
FIG. 4 is a graphical representation of a compacting sequence.

FIG. 4 graphically portrays a compacting sequence. All records except for records 58 and 60 are active records, i.e., records that have not been marked as deleted. The compact operation copies active records sequentially from the start of the source sector 62 to the start of the destination sector 64. For example, records 66, 68, and 70 are sequentially copied from sector 62 to sector 64. Records that are marked as deleted (i.e., records 58, 60) are not copied. As new records are copied, the offsets of their parent (linked) record is updated. For example, since record 58 is not copied, record 72 is now placed directly after record 70. Therefore, since records 70 and 72 share the same KeyID, the NextRecord offset field 74 of record 70 must be updated to show the change in the offset between the two records. Each compact will result in recapturing a portion of memory space equal to the size of the deleted records and their headers, as shown by recaptured space 76.

Flash store API

The foregoing implementation of a persistent flash store is designed to work in a WinCE environment. The software control for the flash store comprises two modules, flsh.dll and flshstor.dll. flsh.dll is a device.exe style WinCE device driver that exists for the sole purpose of getting runtime during system startup. flshstor.dll implements COM classes which can be instantiated by user applications.

The IFlashStore COM interface is the interface through which applications gain access to the lower level persistent store functionality. A single COM class implements this interface, CLSID_FlashStore. Applications can CoCreateInstance( ) an instance of CLSID_FlashStore and then make the following calls on its IFlashStore interface.

IFlashStore Methods
  METHOD OpenKey
  HRESULT OpenKey(LPCTSTR IpKeyName, PDWORD pdwKeyID)
Description
  OpenKey attempts to open a key of IpKeyName. If IpKeyName does not exist, a key with that name is created. A successful call returns the keyID of this key in pdwKeyID. If OpenKey returns FLASH_E_NO_MORE_KEYS, no free keyIDs exist in the store.
Parameters

| Name | Type | Description |
| --- | --- | --- |
| IpKeyName | IN LPCTSTR | Pointer to string containing keyName. keyName may not exceed FLASH_MAX_KEYLEN (currently 127 characters) |
| pdwKeyID | OUT PDWORD | Contains keyID if call succeeded |

Return Values
  S_OK
  FLASH_E_ACCESS
  FLASH_E_IO
  FLASH_E_NOSPACE
  FLASH_E_KEYTOOLONG
  FLASH_E_NO_MORE_KEYS
  E_INVALIDARG
  METHOD DeleteKey
  HRESULT DeleteKey(DWORD dwKeyID)
Description
  DeleteKey deletes a key and all of its records. DeleteKey prevents keyID 0 from being deleted (which is used internally as the index between key names and key IDs), returning FLASH_E_IO if 0 is passed as dwKeyID.
Parameters

| Name | Type | Description |
| --- | --- | --- |
| dwKeyID | IN DWORD | KeyID to delete |

Return Values
  S_OK
  FLASH_E_ACCESS
  FLASH_E_IO
  METHOD GetRecord
  HRESULT GetRecord(DWORD dwKeyID, DWORD dwRecordNumber, PULONG pulhint, PDWORD pdwSize, PVOID pBuffer)
Description
  GetRecord retrieves a record from the flash store. Each key (as specified by dwKeyID) has an array of records associated with it. Applications can retrieve a specific record number from the store by passing an index value as dwRecordNumbers. Applications can quickly iterate through a key's records by passing pdwHint back to subsequent calls to GetRecord. If a valid pdwHint is passed, GetRecord will return the next record associated with the key and update pdwHint, ignoring dwRecordNumber. The following code is an example of how to correctly iterate through IFlashStore records.

```
ULONG ulHint=0;
DWORD i;
BYTE buffer[BUFFER_SIZE];
HRESULT hr;
for( i=0, dwSize=BUFFER_SIZE;
    SUCCEEDED( hr=iFlashStore→GetRecord(
      dwKeyID, i,
      &ulHint, &dwSize, buffer ));
    i++, dwSize=BUFFER_SIZE
)
// . . .
```

GetRecord returns FLASH_E_NORECORD if the specified record does not exist.

Parameters

| Name | Type | Description |
|---|---|---|
| dwKeyID | IN DWORD | KeyID, as returned by OpenKey |
| dwRecord Number | IN DWORD | Record index, 0-based. Ignored if pdwHint is valid |
| pulHint | IN OUT PULONG | Hint value for quick iterating. Pass 0 if random record access is desired. Initialize to 0 and then pass the returned value to subsequent calls to GetRecord if you are iterating through records. |
| pdwSize | IN OUT PDWORD | On input, pdwSize contains the size in bytes of pBuffer. After a successful call or a call returning FLASH_E_MOREDATA, contains the true size in bytes of the record. |
| pBuffer | OUT PBYTE | Contains record data after a successful call. If GetRecord returns FLASH_E_MOREDATA, as much of the record as could fit has been copied into the buffer. |

Return Values
  S_OK
  FLASH_E_ACCESS
  FLASH_E_IO
  FLASH_E_MOREDATA
  FLASH_E_NORECORD
  E_INVALIDARG
METHOD CloseKey
  HRESULT GetRecord(DWORD dwKeyID)
Description
  CloseKey closes a key opened by OpenKey.
Parameters

| Name | Type | Description |
|---|---|---|
| dwKeyID | IN DWORD | KeyID, as returned by OpenKey |

Return Values
  S_OK
METHOD DeleteRecord
  HRESULT DeleteRecord(DWORD dwKeyID, DWORD dwRecordNumber)
Description
  DeleteRecord deletes a record from the store. Deleting record 0 will cause what was previously record 1 to become record 0, etc.

Parameters

| Name | Type | Description |
|---|---|---|
| dwKeyID | IN DWORD | KeyID, as returned by OpenKey |
| dwRecord Number | IN DWORD | Record number to delete |

Return Values
  FLASH_E_ACCESS
  FLASH_E_IO
  FLASH_E_NORECORD
METHOD AddRecord
  HRESULT AddRecord(DWORD dwKeyID, DWORD dwSize, PVOID pBuffer)
Description
  AddRecord adds a record to the store. The newly added record will become the last record associated with dwKeyID. That is, if a key has two records, (record numbers 0 and 1), the newly added record will be record number 2.
Parameters

| Name | Type | Description |
|---|---|---|
| dwKeyID | IN DWORD | KeyID, as returned by OpenKey |
| dwSize | IN DWORD | Size in bytes of the data in pBuffer |
| pBuffer | OUT PVOID | Record data |

Return Values
  FLASH_E_ACCESS
  FLASH_E_IO
  FLASH_E_NOSPACE
  E_INVALIDARG
METHOD GetFreeSpace
  HRESULT GetFreeSpace(PULONG pcBytesFree)
Description
  GetFreeSpace returns the largest record (not including overhead) that can be added to the store successfully. If a compact is possible, this method returns the number of bytes free if a compact were performed. If a compact is not possible, this method returns the current number of bytes free.
Parameters

| Name | Type | Description |
|---|---|---|
| pcBytesFree | OUT PULONG | Bytes free in the store |

Return Values
  E_INVALIDARG
IRegistryPersister Methods
  METHOD MakeRegKeyPersist
  HRESULT MakeRegKeyPersist(HKEY hKey, LPCTSTR lpKeyName)
Description
  MakeRegKeyPersist persists a registry subkey, all of its values, and all of the subkeys and values beneath it. If the specified subkey was previously persisted via a call to MakeRegKeyPersist, the previous record is deleted if MakeRegKeyPersist successfully adds the new record. MakeRegKeyPersist will fail if the registry chunk to persist exceeds MAX_REG_PERSIST_SIZE.

Parameters

| Name | Type | Description |
|---|---|---|
| hKey | IN HKEY | A top-level registry key (like HKEY_LOCAL_MACHINE) |
| lpKeyName | LPCTSTR | A subkey path |

Return Values
  E_INVALIDARG
  FACILITY_WIN32 errors returned by the registry API
  FLASH_E_REGISTRY Conclusion The flash store provides a system for persistent storage of data, such as user preferences. It provides a valid copy of data at all times so that no data is lost during a power interruption or other system anomaly. The flash store also does not require the overhead normally associated with a file-storage device. By use of a linked-list file structure in combination with a set of predefined API calls, a system that uses the flash store can easily store and make changes to a variety of user-preference data. The flash store eliminates the necessity of having to store user preference information on database servers. This will facilitate increased access to the Internet for users who desire to use set-top boxes but don't have or want to use a single ISP, such as WebTV®.

Having described the principles of the invention with reference to a detailed implementation, it should be apparent that the invention can be modified in arrangement and detail without departing from such principles. For example, while the exemplary implementation of the flash store is for use in a set-top box, the flash store is suitable for use in any system requiring a persistent storage device. Additionally, the specific formats of the EraseBlockHeader and FlashRecordHeader can be modified to suit the specific requirements of a particular system. For example, the size of the signature could be 8 bits instead of 16 bits (two bytes). Similarly, the size and arrangement of the other fields in these headers could be modified. The size and number of sectors may also be altered. Many other such variations will be apparent to those skilled in the art.

In view of the many implementations to which the principles of the invention can be applied, it should be understood that the detailed implementation is exemplary only and should not be taken as limiting the scope of the invention. Rather, I claim as my invention all such implementations as may come within the scope and spirit of the following claims and equivalents thereto.

We claim:

1. A method of operating a flash memory, the flash memory comprising plural memory locations defining a sector, the memory locations defining a sector being re-initializable as a group only, the method comprising:
  storing plural data records in said sector, each data record including a header having at least first and second single-bit flags;
  each data record further comprising ID data and a next record pointer, the next record pointers of records having the same ID data forming a linked list;
  wherein re-initialization of said sector converts all of said flags to a "1" value.

2. The method of claim 1 further comprising storing, in at least a first of said data records, a pointer to a second data record having data related to the first data record.

3. The method of claim 1 further comprising storing, in substantially each of said data records, a pointer to another data record having data related thereto.

4. The method of claim 3 wherein the pointer is an offset pointer.

5. A method of operating a flash memory, the flash memory comprising plural memory locations defining a sector, the memory locations defining a sector being re-initializable as a group only, the method comprising:
  storing plural data records in said sector, each data record having a first type of header related thereto; and
  storing, in said sector, a second type of header distinct from the first, said second type of header having at least first, second, and third single-bit flags;
  each data record further comprising ID data and a next record pointer, the next record pointers of records having the same ID data forming a linked list;
  wherein re-initialization of said sector converts all of said flags to "1" values.

6. The method of claim 5 in which one of said single-bit flags indicates that the sector has been initialized and is empty.

7. The method of claim 5 in which one of said single-bit flags indicates that the data stored in the sector may be invalid.

8. A method of operating a flash memory, the flash memory comprising at least first and second sectors, each comprising plural memory locations that are re-initializable only as a group, the method comprising:
  storing in a header of the first sector a predetermined plural-bit signature string;
  storing in a header of the second sector the same predetermined plural-bit signature string; and
  resetting said signature string to all "1"s upon re-initialization of the flash memory;
  wherein the absence of said predetermined plural-bit signature string in each header indicates that the data in the corresponding sector should not be assumed to be valid.

9. The method of claim 8 in which said plural-bit signature string comprises at least 8 bits.

10. The method of claim 8 in which said plural-bit signature string comprises at least 16 bits.

11. A flash memory having stored therein a data structure, comprising:
  a sector header comprising a signature which identifies the sector as valid; and
  plural record headers each being associated with a record, each record header including ID data and a next record pointer, the next record pointers of records having the same ID data forming a linked list.

12. A method of operating a flash memory to locate records identified by a text string name, the flash memory comprising plural memory locations defining a sector, the memory locations defining a sector being re-initializable as a group only, each sector including plural records, each record having a header associated therewith, each header having ID data and a next record pointer, the method comprising:

storing in certain of said headers a predetermined ID datum, said predetermined ID datum indicating that the associated record identifies an association between a text string name and a different ID datum;

searching for record headers having said predetermined ID datum;

determining whether said text string name is found in the associated record;

if not, following the next record pointer and, at the pointed-to-record, repeating the foregoing step; and if the text string name is found, then noting the different ID datum associated therewith, and searching for a record header having said different ID datum.

13. The method of claim 12 including copying data from the flash memory to another memory, and performing said searching in the other memory.

14. A method of operating an internet/television terminal having a CPU, RAM, and non-volatile storage for an operating system and user preferences, comprising:

providing a flash memory to serve as said non-volatile storage;

storing a user preference in a first location in said flash memory;

if available storage in said flash memory exceeds a threshold, updating said user preference by marking the earlier-stored user preference as invalid, and storing an updated user preference in a different, second, location in said flash memory;

if available storage in said flash memory does not exceed a threshold, updating said first user preference by copying valid data found in a first contiguous range of storage locations of length N bytes to a contiguous range of storage locations of length M bytes, and assuring that M is less than N by omitting copying of data that is invalid, and then storing the updated user preference.

15. A method of operating a flash memory, the flash memory comprising plural memory locations defining a first and second sector, each sector being re-initializable as a group only and having a header, the first sector containing a plurality of data records marked as active or deleted, the method comprising:

reinitializing the second sector and marking the second sector header to indicate it is available to have data written to it;

copying the records that are marked active from the first sector to the second sector while skipping the records marked as deleted; and marking the header of the second sector to signify successful completion of the copying of records from the first sector.

16. The method of claim 15, wherein each sector has a start and an end and the active records in the first sector are written sequentially to the second sector from the start of each sector toward the end thereof.

17. The method of claim 15, wherein the header in the first sector is marked to indicate that the first sector is no longer available to have data records written to it.

18. A method comprising:

erasing a first flash memory sector;

copying the contents of a second flash memory sector to the first flash memory sector, the copy excluding memory locations of the second flash sector which are identified as at least one of deleted and not finished writing;

identifying the first flash memory sector as copy-complete; and identifying the second flash memory sector as erasable.

19. The method of claim 18 wherein copying the contents of a second flash memory sector to the first flash memory sector further comprises:

copying records of the second flash memory sector exclusive of records which are marked as at least one of deleted and not finished writing.

20. The method of claim 18 wherein copying the contents of a second flash memory sector to the first flash memory sector fewer comprises:

locating copied memory locations of the second sector in the first sector to create a single contiguous block of unused memory locations in the first flash memory sector.

21. A memory system comprising:

at least one of memory control hardware and software; and a first flash memory sectors comprising
a signature;
a sector status; and
a first record, comprising
a record status;
an identifier; and
a next record pointer;

the at least one of memory control hardware and software causing the first sector to erase upon a determination that the signature does not match a predetermined value.

22. The system of claim 21 further comprising: a second record comprising data which associates the first record identifier with a string.

23. The system of claim 21, the next record pointer of the first record identifying a memory location of a second record having the same identifier as the first record.

24. A flash memory having stored therein a data structure, comprising:

a sector header;

plural record headers;

each record header being associated with a record; and each record header including ID data and a next record pointer;

wherein certain of said record headers have predetermined ID data therein, said predetermined ID data indicating that the associated record identifies an association between a text string name and a different ID datum;

wherein records can be located by reference to text string names by searching for a record header having said predetermined ID data, determining whether the text string name is found therein, if not, then following the next record pointer and repeating the process, and if the text string name is found, then searching for a record header having said different ID datum.

25. The flash memory of claim 24 in which the predetermined ID data is "0".

26. The flash memory of claim 24 in which the record stores at least one of Internet cookies, Internet favorites, user preferences, and communication settings.

27. The method of claim 1 further comprising:

operating the flash memory in a set top box to store at least one of Internet cookies, Internet favorites, user preferences, and communication settings.

28. The method of claim 5 further comprising:

operating the flash memory in a set top box to store at least one of Internet cookies, Internet favorites, user preferences, and communication settings.

29. The method of claim 8 further comprising:

operating the flash memory in a set top box to store at least one of Internet cookies, Internet favorites, user preferences, and communication settings.

30. The method of claim 12 further comprising:

operating the flash memory in a set top box to store at least one of Internet cookies, Internet favorites, user preferences, and communication settings.

31. The method of claim 15 further comprising:

operating the flash memory in a set top box to store at least one of internet cookies, Internet favorites, user preferences, and communication settings.

* * * * *